United States Patent
Kwon et al.

(10) Patent No.: US 8,085,684 B2
(45) Date of Patent: Dec. 27, 2011

(54) METHOD AND APPARATUS FOR IDENTIFYING BASE STATION IN WIRELESS COMMUNICATION SYSTEM

(75) Inventors: Sung-Oh Kwon, Seoul (KR); Neung-Hyung Lee, Seoul (KR); Kyeong-In Jeong, Hwaseong-si (KR); Jong-Hyung Kwun, Seongnam-si (KR); Jong-In Kim, Seongnam-si (KR); Ok-Seon Lee, Suwon-si (KR); Hwa-Jin Cha, Seongnam-si (KR); Ho-Sun Youm, Seoul (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 178 days.

(21) Appl. No.: 12/491,022

(22) Filed: Jun. 24, 2009

(65) Prior Publication Data
US 2009/0316595 A1     Dec. 24, 2009

(30) Foreign Application Priority Data

Jun. 24, 2008  (KR) ........................ 10-2008-0059431

(51) Int. Cl.
  *H04L 1/00* (2006.01)
  *H04L 12/26* (2006.01)
  *H04W 4/00* (2009.01)
(52) U.S. Cl. ....................................... 370/252; 370/328
(58) Field of Classification Search .................. 370/252, 370/328
See application file for complete search history.

(56) References Cited

U.S. PATENT DOCUMENTS

2009/0047960 A1 * 2/2009 Gunnarsson et al. ......... 455/436
* cited by examiner

*Primary Examiner* — Ronald Abelson
(74) *Attorney, Agent, or Firm* — Jefferson IP Law, LLP

(57) ABSTRACT

A method and an apparatus for identifying a base station in a wireless communication system are provided. The method includes storing a Neighbor Cell List (NCL) received from a serving base station, obtaining a Physical Cell IDentifier (PCID) from a signal received from a neighbor base station, and identifying whether the neighbor base station is a macro base station or a femto base station by determining whether the obtained PCID exists in the stored NCL.

18 Claims, 8 Drawing Sheets

| NAME | TYPE |
|---|---|
| CARRIER FREQUENCY | MANDATORY |
| CELL ID | OPTIONAL |

FIG.2

METHOD AND APPARATUS FOR IDENTIFYING BASE STATION IN WIRELESS COMMUNICATION SYSTEM

PRIORITY

This application claims the benefit under 35 U.S.C. §119 (a) of a Korean patent application filed in the Korean Intellectual Property Office on Jun. 24, 2008 and assigned Serial No. 10-2008-0059431, the entire disclosure of which is hereby incorporated by reference.

BACKGROUND OF THE INVENTION

1. Field of the Invention

The present invention relates to a method and an apparatus for identifying a base station in a wireless communication system. More particularly, the present invention relates to a method and an apparatus for allowing User Equipment (UE) to identify a macro base station and a femto base station using a Neighbor Cell List (NCL) and a Physical Cell IDentifier (PCID) of each base station.

2. Description of the Related Art

In a cellular wireless communication system, a channel status is deteriorated due to a geographical factor inside a cell, a distance between a User Equipment (UE) and a base station, or movement of the UE. Therefore, communication between the UE and the base station is not promptly performed. More particularly, when the UE is located inside a closed building, such as an office or a house, a channel between a base station and the UE is deteriorated because a shadow region is formed. The UE located in the shadow region cannot promptly perform communication with the base station.

Recently, a femto cell concept is proposed in order to provide a high level data service to more users while solving a service limitation of an indoor shadow region. As illustrated in FIG. 1, the femto cell is a small cell area formed by a femto base station which accesses a mobile communication core network via a broadband network installed inside an indoor space. Since the femto cell has a very small cell area compared to a macro cell, a plurality of femto cells may be installed inside one macro cell area. Also, a subscriber may pay an installation cost of the femto base station, and install and remove the femto base station themselves. Therefore, only a registered subscriber may use the femto base station.

When a signal is received from a base station, the UE needs to identify whether the base station is a macro base station or a femto base station. Also, if the base station is a femto base station, the UE needs to identify whether the femto base station is a femto base station which may be used by the UE. Such identification of a base station may be achieved through an identifier included in a system information message, but an identification method using the system information message requires a long processing time and a resource for the processing.

A macro base station assigns one Physical Cell IDentifier (PCID) to a femto base station located in a service area of the macro base station. At this point, the number of PCIDs which the macro base station may assign to the femto base stations is limited. Therefore, when a number of femto base stations greater than the number of PCIDs which may be assigned to the femto base stations exist in the service area of the macro base station, the macro base station assigns a repeated PCID to the femto base stations. In this case, a problem occurs in which the UE cannot identify femto base stations having the same PCID.

Therefore, various conventional techniques for performing the above-described identification of a base station in a physical layer are performed. Examples of the conventional techniques include a method for using an identifier which classifies PCIDs into PCIDs for femto base stations and PCIDs for macro base stations, a method for discriminating a range of a PCID of a femto base station from a range of a PCID of a macro base station, a method for using frequencies differently for a femto base station and a macro base station, and a method for using an identifier included in an NCL.

However, the method for using an identifier which classifies PCIDs into PCIDs for femto base stations and PCIDs for macro base stations, and the method for using an identifier included in an NCL necessarily cause modification of a standard. Therefore, these methods cannot support existing UEs. Also, the method for discriminating the ranges of PCIDs is limited when a ratio of a femto base station and a macro base station is different for each business and each region. Therefore, PCIDs should be operated differently. Also, the method for using frequencies differently cannot support a business depending on a resource of the business.

Therefore, a need exists for a method and an apparatus for identifying a macro base station and a femto base station in a wireless communication system.

SUMMARY OF THE INVENTION

An aspect of the present invention is to address at least the above mentioned problems and/or disadvantages and to provide at least the advantages described below. Accordingly, an aspect of the present invention is to provide a method and an apparatus for identifying a base station in a wireless communication system.

Another aspect of the present invention is to provide a method and an apparatus for allowing a User Equipment (UE) to identify a base station in a physical layer without modification of a standard in a wireless communication system.

Still another aspect of the present invention is to provide a method and an apparatus for allowing a UE to identify a macro base station and a femto base station using a Neighbor Cell List (NCL) and a Physical Cell IDentifier (PCID) of each base station in a wireless communication system.

Yet another aspect of the present invention is to provide an apparatus and a method for allowing a UE to identify whether a base station is an accessible base station using an NCL and a PCID of each base station in a wireless communication system.

In accordance with an aspect of the present invention, a method for identifying, at a User Equipment (UE), a base station in a wireless communication system is provided. The method includes storing a Neighbor Cell List (NCL) received from a serving base station, obtaining a Physical Cell IDentifier (PCID) of a relevant base station from a signal received from a neighbor base station, and identifying whether the relevant base station is a macro base station or a femto base station by determining whether the obtained PCID exists in the stored NCL.

In accordance with another aspect of the present invention, a method for generating an NCL of a femto base station in a wireless communication system is provided. The method includes generating an NCL including PCIDs of macro base stations with which the femto base station itself is associated, and PCIDs of different neighbor femto base stations which are associated with a Closed Subscriber Group (CSG) of the femto base station itself.

In accordance with yet another aspect of the present invention, an apparatus for identifying, at User Equipment (UE), a base station in a wireless communication system is provided. The apparatus includes a storage unit for storing an NCL received from a serving base station, a receiver for receiving signals from the serving base station and a neighbor base station, and a controller for obtaining a PCID of a relevant base station from a signal received from the neighbor base station, and for identifying whether the relevant base station is a macro base station or a femto base station by determining whether the obtained PCID exists in the stored NCL.

In accordance with still another aspect of the present invention, an apparatus for generating an NCL of a femto base station in a wireless communication system is provided. The apparatus includes a controller for generating an NCL including PCIDs of macro base stations with which the femto base station itself is associated, and PCIDs of different neighbor femto base stations which are associated with a CSG of the femto base station itself.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which:

FIG. 2 is a view illustrating neighbor cell information broadcasted by each base station in a wireless communication system according to an exemplary embodiment of the present invention;

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a method and an apparatus for allowing User Equipment (UE) to identify a macro base station and a femto base station, and identifying whether the femto base station is a femto base station accessible by the UE using a Neighbor Cell List (NCL) and a Physical Cell IDentifier (PCID) of each base station in a wireless communication system.

As an alternative for identifying a macro base station and a femto base station in a physical layer without modification of a standard, an NCL used by each base station is utilized.

FIG. 2 is a view illustrating neighbor cell information broadcasted by each base station in a wireless communication system according to an exemplary embodiment of the present invention.

Referring to FIG. 2, the NCL includes frequency information and cell ID information of each neighbor cell. A Wideband Code Division Multiple Access (WCDMA) system, a Long Term Evolution (LTE) system, and a CDMA2000 system use the cell ID information as a scrambling code to facilitate detection of a neighbor base station in a physical layer.

Figure 1:
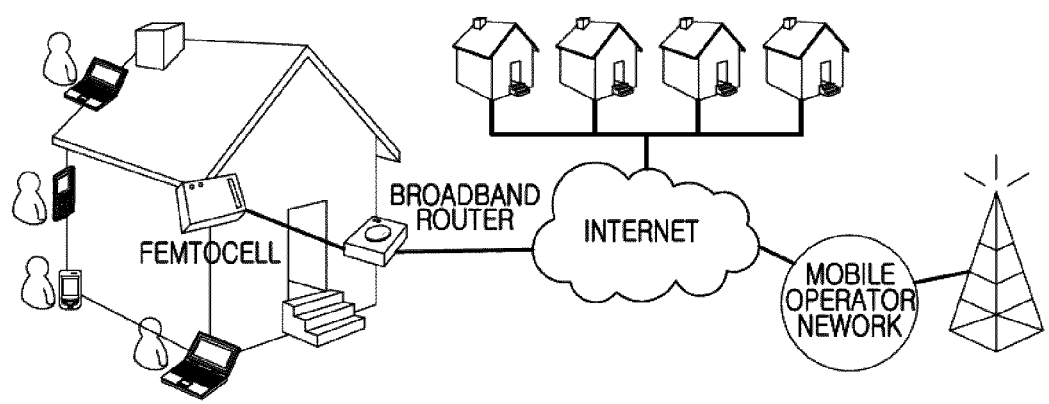
FIG. 1 is a view illustrating the construction of a conventional wireless communication system including a femto cell.
Figure 3:
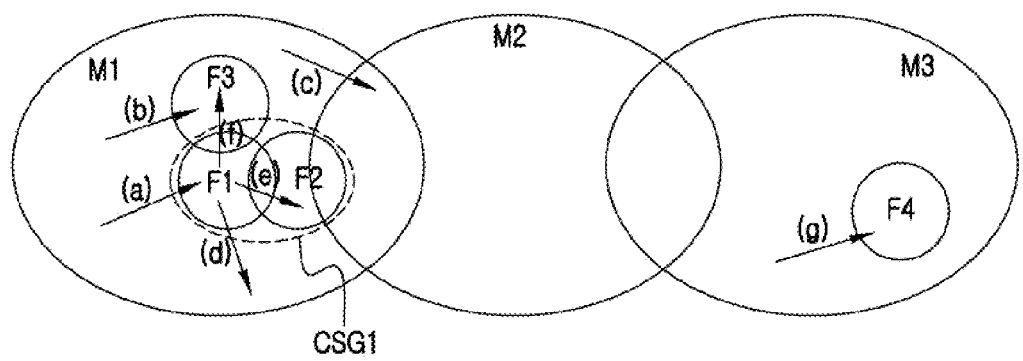
FIG. 3 is a view illustrating a scenario allowing User Equipment (UE) movement in a wireless communication system according to an exemplary embodiment of the present invention.

In an exemplary implementation, a macro base station transmits an NCL including information of neighbor macro base stations to a UE, a femto base station transmits an NCL including information of macro base stations to which the femto base station itself belongs to the UE, and the UE stores and manages the NCLs received from the macro base station and the femto base station. When a new NCL is received, the UE stores the new NCL instead of an NCL already stored. Also, the UE which supports a femto cell stores information of a macro cell including a set of femto base stations accessible by the UE, i.e., a Closed Subscriber Group (CSG) as a fingerprint or a footprint. For example, as illustrated in FIG. 3, when the UE includes femto base stations F1 and F2 as a CSG of the UE itself, the UE stores macro cells M1 and M2 including the CSG, as a fingerprint. At this point, the fingerprint may be managed for each femto cell.

The femto base station may incorporate information of a macro base station including a CSG of the femto base station itself and femto base stations which belong to the CSG into the NCL, and transmit the NCL. For example, referring to FIG. 3, the base station of a femto cell F1 generates an NCL including a PCID of the femto cell F2 which belongs to the same CSG, and PCIDs of the macro cells M1 and M2 including the CSG, and transmits the generated NCL to the UE.

Here, when the femto base station incorporates information of a macro base station to which the femto base station itself belongs into an NCL, all NCLs include information of macro base stations, so that the UE may determine whether a base station is a macro base station or a femto base station by determining whether a PCID of the base station from which a signal is received is included in the NCL.

On the other hand, when the femto base station incorporates information of a macro base station to which the femto base station itself belongs into an NCL, and simultaneously incorporates information of femto base stations which belong to a CSG of the femto base station, the UE may determine whether a base station is a base station accessible by the UE by determining whether a PCID of the base station from which a signal is received is included in the NCL.

An exemplary construction and procedure of a UE for identifying a relevant base station using an NCL and a PCID of the base station in a wireless communication system are described below.

Figure 4:
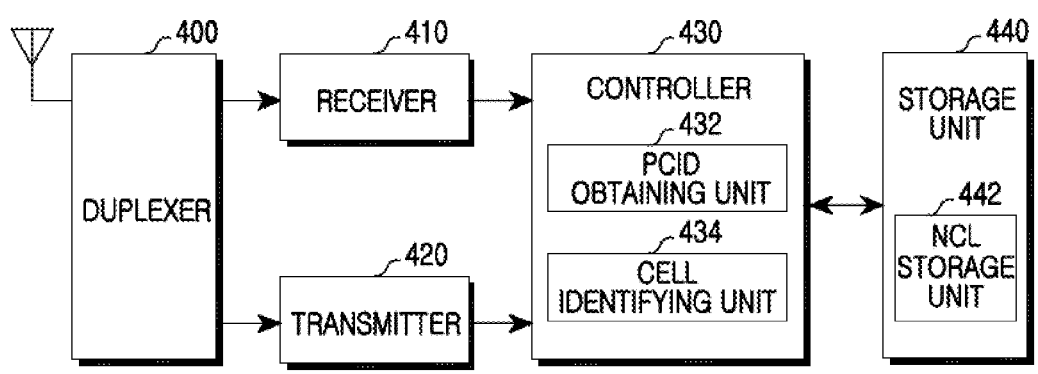
FIG. 4 is a block diagram illustrating a UE in a wireless communication system according to an exemplary embodiment of the present invention.

FIG. 4 is a block diagram illustrating a UE in a wireless communication system according to an exemplary embodiment of the present invention.

Referring to FIG. 4, the UE includes a duplexer 400, a receiver 410, a transmitter 420, a controller 430, and a storage unit 440. The controller 430 includes a PCID obtaining unit 432 and a cell identifying unit 434. The storage unit 440 includes an NCL storage unit 442.

The duplexer 400 transmits a transmission signal provided from the transmitter 420 via an antenna, and provides a reception signal from the antenna to the receiver 410 according to a duplexing scheme.

The receiver 410 converts the reception signal provided from the duplexer 400 to a baseband signal, and provides the baseband signal to the controller 430. For example, when the wireless communication system uses an Orthogonal Frequency Division Multiplexing (OFDM) scheme, the receiver 410 includes a Radio Frequency (RF) processor, an Analog/Digital Converter (ADC), an OFDM demodulator, and a decoder. Accordingly, the RF processor converts an RF signal provided from the duplexer 400 to a baseband analog signal. The ADC converts the analog signal provided from the RF processor to digital sample data. The OFDM demodulator transforms sample data in a time domain provided from the ADC to data in a frequency domain by performing Fast Fourier Transform (FFT). The decoder demodulates and decodes a signal provided from the OFDM demodulator according to a Modulation and Coding Scheme (MCS) level.

The controller 430 controls an overall operation of the UE. More particularly, the controller 430 controls an NCL received from a serving base station to be stored in the NCL storage unit 442 by providing the NCL to the storage unit 440, and controls and performs a process for identifying a relevant base station by obtaining a PCID from a received signal and comparing the PCID with a PCID included in the NCL.

The controller 430 obtains a PCID of a signal provided from the receiver 410 through the PCID obtaining unit 432, and determines whether the obtained PCID is included in the NCL stored in the NCL storage unit 442 using the cell identifying unit 434 to identify whether a base station corresponding to the PCID is a macro base station or a femto base station, and whether the base station is an accessible base station. Also, when the base station corresponding to the PCID is a femto base station, the controller 430 identifies the femto base station as a femto base station accessible by the UE by determining whether the UE exists in the area of a femto base station included in a current CSG or the area of a macro base station included in a fingerprint through the cell identifying unit 434. During an idle state, when it is determined that the base station corresponding to the PCID is a macro base station or a femto base station inside a macro base station which belongs to a fingerprint, the controller 430 obtains cell information by receiving system information of the base station corresponding to the PCID, and performs a process for updating a Tracking Area (TA) by identifying whether the base station is a macro base station or a femto base station accessible by the UE. On the other hand, during an active state, when it is determined that the base station corresponding to the PCID is a macro base station or a femto base station inside a macro base station which belongs to a fingerprint, the controller 430 performs a process for performing measurement for a handover and reporting the measurement result to a serving base station.

The transmitter 420 converts a transmission signal to an RF signal, and provides the RF signal to the duplexer 400 under control of the controller 430. For example, when the wireless communication system uses an OFDM scheme, the transmitter 420 includes an encoder, an OFDM modulator, a Digital/Analog Converter (DAC) and an RF processor. The encoder encodes and modulates a transmission signal according to an MCS level under control of the controller 430. The OFDM modulator converts data in the frequency domain provided from the encoder to sample data (i.e., an OFDM symbol) in a time domain by performing Inverse FFT (IFFT). The DAC converts sample data provided from the OFDM modulator to an analog signal. The RF processor converts a baseband analog signal provided from the DAC to an RF signal.

The storage unit 440 stores programs required for an overall operation of the UE and various data, and includes the NCL storage unit 442 to store and update an NCL received from the serving base station. Also, when the UE supports a femto base station, the storage unit 440 stores information of a macro cell including a set of femto base stations accessible by the UE, i.e., a CSG as a fingerprint or a footprint.

An exemplary method for allowing UE to identify a base station is described below with reference to FIG. 3.

FIG. 3 is a view illustrating a scenario allowing User Equipment (UE) movement in a wireless communication system according to an exemplary embodiment of the present invention.

Referring to FIG. 3, a wireless communication system includes macro base stations M1, M2 and M3, and femto base stations F1, F2, F3 and F4. In an exemplary implementation, the UE includes the femto base stations F1 and F2 as a CSG which is a set of accessible base stations, and stores the macro base stations M1 and M2 as a fingerprint of the CSG.

The macro base station M1 incorporates PCIDs of the neighbor base stations M2 and M3 into an NCL, and the macro base station M2 incorporates PCIDs of the neighbor base stations M1 and M3 into an NCL. The macro base station M3 incorporates PCIDs of the neighbor base stations M1 and M2 into an NCL and transmits the NCL.

The femto base stations F1 and F2 are femto base stations accessible by the UE. The femto base stations F1 and F2 may incorporate the macro base stations M1 and M2 to which the femto base stations F1 and F2 belong into the NCL, and transmit the NCL to the UE. Alternatively, the femto base stations F1 and F2 may incorporate the macro base stations M1 and M2 including the CSG, and femto base stations included in the CSG into the NCL, and transmit the NCL to the UE. That is, the femto base station F1 may incorporate PCIDs of the macro base stations M1 and M2, and a PCID of the femto base station F2 which belongs to the CSG into the NCL, and transmit the NCL to the UE. Also, the femto base station F2 may incorporate PCIDs of the macro base stations M1 and M2, and a PCID of the femto base station F1 which belongs to the CSG into the NCL, and transmit the NCL to the UE. Also, the femto base stations F3 and F4 are femto base stations which do not allow access to the UE. The femto base station F3 includes an area overlapping the area of the femto base station F1. The femto base station F4 exists inside a cell of a macro base station which does not belong to a fingerprint of the UE.

Still referring to FIG. 3, (a) to (g) denote movement directions of the UE. For example, (a) denotes a case in which the UE moves from the macro base station M1 and receives a signal of the femto base station F1, and (e) denotes a case in which the UE moves from the femto base station F1 and receives a signal of the femto base station F2.

An exemplary method for allowing a UE to identify a base station based on the construction of FIG. 3 is described with reference to FIGS. 5 and 6.

Figure 5:
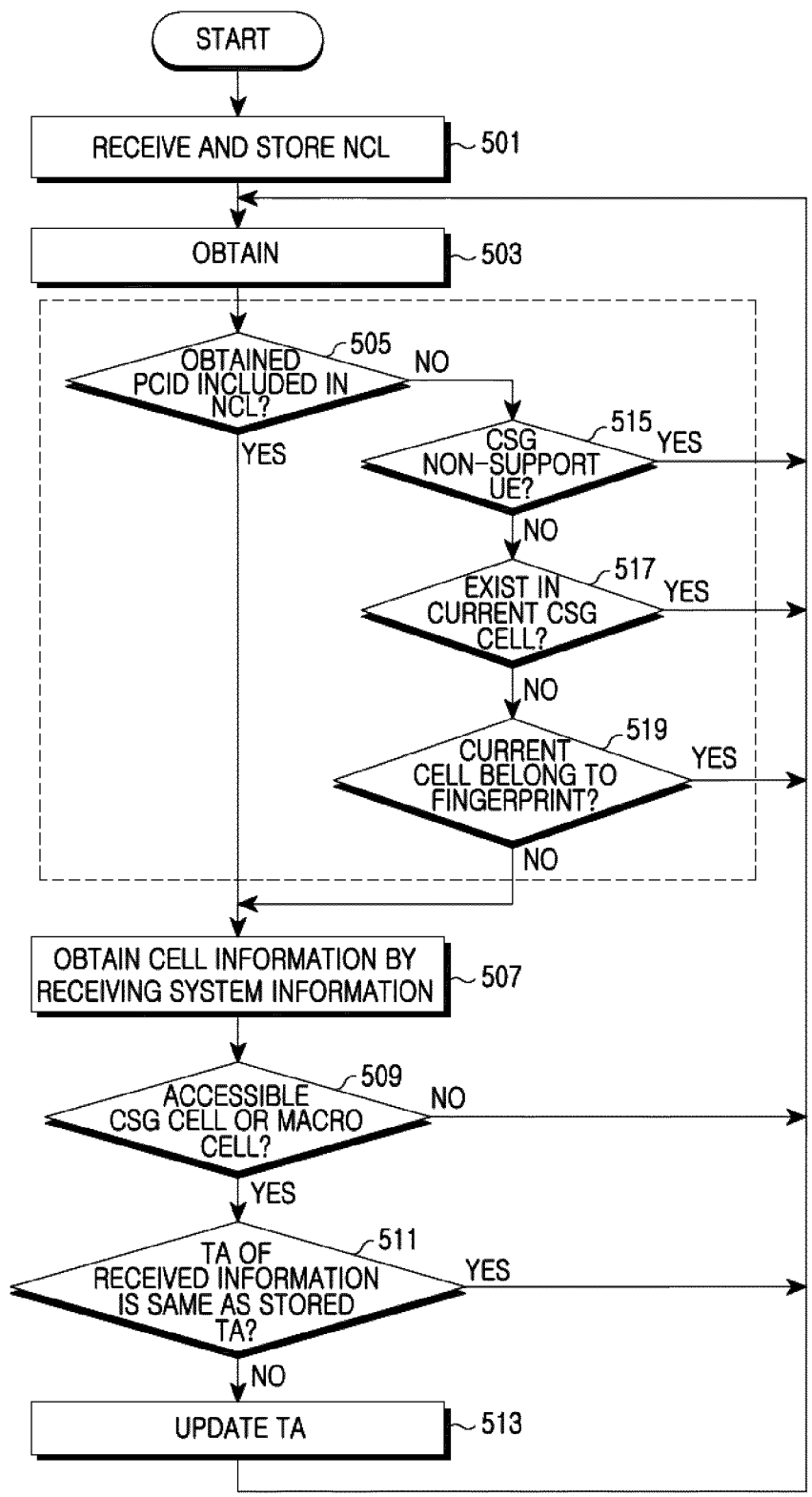
FIG. 5 is a flowchart identifying, at a UE in an idle state, a base station in a wireless communication system according to an exemplary embodiment of the present invention.

FIG. 5 is a flowchart identifying, at a UE in an idle state, a base station in a wireless communication system according to an exemplary embodiment of the present invention.

Referring to FIG. 5, in step 501, the UE in the idle state receives an NCL from a serving macro base station or a serving femto base station, and stores the NCL. When the serving base station is a macro base station, the received NCL includes information of a neighbor macro base station. When the serving base station is a femto base station, the received NCL may include information of a macro base station to which the femto base station belongs, or include information of a macro base station including a CSG of the UE and information of femto base stations which belong to the CSG.

In step 503, the UE obtains PCIDs of relevant base stations from signals having reception power of at least a certain threshold. In step 505, the UE determines whether the obtained PCIDs of the respective base stations are included in the stored NCL. When the NCL of the femto base station includes information of the macro base station, the UE may identify whether the relevant base station is a macro base station or a femto base station through step 505. When the NCL of the femto base station includes information of the macro base station and information of the femto base stations which belong to the CSG, the UE may determine whether the relevant base station is an accessible base station through step 505.

When the obtained PCID is included in the stored NCL, the UE performs step 507. When the obtained PCID is not included in the stored NCL, the UE performs step 515. Here, assuming that the NCL of the femto base station includes information of a macro base station with reference to FIG. 3, in the cases of (c) and (d), the obtained PCID exists in the NCL. In the cases of (a), (b), (e), (f) and (g), the obtained PCID does not exist in the NCL. On the other hand, assuming that the NCL of the femto base station includes information of the macro base station and information of femto base stations which belong to the CSG, in the cases of (c), (d) and (e), the obtained PCID exists in the NCL. In the cases of (a), (b), (f) and (g), the obtained PCID does not exist in the NCL.

In step 515, the UE determines whether the UE is a CSG non-support UE. Here, the CSG non-support UE denotes the UE including no CSG cell which receives a service. When the UE is a CSG non-support UE, the UE returns to step 503 and performs the subsequent steps.

On the other hand, when the UE is not a CSG non-support UE, the UE determines whether a serving base station, which currently provides a service, is a femto base station which belongs to the CSG of the UE or a macro base station in step 517. Whether the serving base station is the femto base station which belongs to the CSG may be recognized using system information of the serving base station.

When the serving base station of the UE is the femto base station which belongs to the CSG, the UE returns to step 503 and performs the subsequent steps. For example, referring to FIG. 3, when a base station F3 of a received signal is not included in the NCL of a serving base station F1 and the serving base station F1 is a femto base station which belongs to the CSG, as in the case of (f), the UE determines that the UE cannot access the base station F3. Here, assuming that the NCL of the femto base station includes information of macro base stations, in the case of (e) of FIG. 3, the UE cannot directly access the base station F2 due to steps 505 and 517, but returns to step 503 to access the base station M1 or M2 and then access the base station F2.

On the other hand, when the serving base station of the UE is the macro base station, the UE determines whether the serving base station is a base station which belongs to a fingerprint stored in the UE in step 519. For example, referring to FIG. 3, when the UE receives a service from a macro base station, and a received signal of a base station is not included in the NCL as in the cases of (a), (b) and (g), the UE determines whether the macro base station is a macro base station including the CSG of the UE. Here, when the UE does not support a fingerprint, the UE does not perform step 519 but may proceed from step 517 to step 507.

When the serving macro base station does not belong to a fingerprint, the UE returns to step 503 and performs the subsequent steps. For example, referring to FIG. 3, when the UE using the macro base station M3 as a serving base station moves in the case of (g) and receives a signal of the femto base station F4, since the femto base station F4 is not included in the NCL of the macro base station M3 and the macro base station M3 is not included in a fingerprint, the UE determines that the UE cannot access the femto base station F4.

On the other hand, when the serving macro base station belongs to the fingerprint, the UE performs step 507. For example, referring to FIG. 3, when the UE using the macro base station M1 as a serving base station moves in the case of (a) or (b), and receives a signal of the femto base station F1 or F3, since the femto base station F1 or F3 is not included in the NCL of the macro base station M1 and the macro base station M1 is included in the fingerprint, the UE performs step 507 in order to determine whether the femto base station F1 or F3 is an accessible femto base station.

Still referring to FIG. 5, in step 507, the UE receives system information from a base station corresponding to the obtained PCID to determine information of a relevant base station. In step 509, the UE determines whether the relevant base station is a macro base station or a femto base station which belongs to the CSG of the UE. For example, referring to FIG. 3, the UE using the macro base station M1 as a serving base station moves in the case of (c) to determine whether the UE receives a signal of the neighbor macro base station M2, moves in the case of (a) to determine whether the UE receives a signal of the femto base station F1 which belongs to a CSG cell of the UE, or moves in the case of (b) to determine whether the UE receives a signal of the femto base station F3 which does not belong to the CSG cell of the UE.

When the relevant base station is not a macro base station or a femto base station which belongs to the CSG of the UE, the UE determines that the UE cannot access the relevant base station, and returns to step 503 and performs the subsequent steps. For example, referring to FIG. 3, when the UE using the macro base station M1 as a serving base station moves in the case of (b) or (g), and receives a signal of the femto base station F3 or F4 which does not belong to the CSG cell of the UE, since the UE cannot access the femto base station, the UE returns to step 503 and detects a signal received from a different base station. Since the case of (g) is limited to the UE not supporting the fingerprint, step 519 is not performed and the UE performs step 509.

On the other hand, when a relevant base station is a macro base station or a femto base station which belongs to the CSG of the UE, the UE determines that the UE may access the relevant base station. In step 511, the UE determines a TA from the received system information and compares the TA with a TA stored in advance. When the TAs are the same as a result of the comparison, the UE returns to step 503 and performs the subsequent steps. When the TAs are different from each other as a result of the comparison, the UE updates the TA by transmitting a Tracking Area Update (TAU) message to the base station in step 513, returns to step 503 and performs the subsequent steps.

Figure 6:
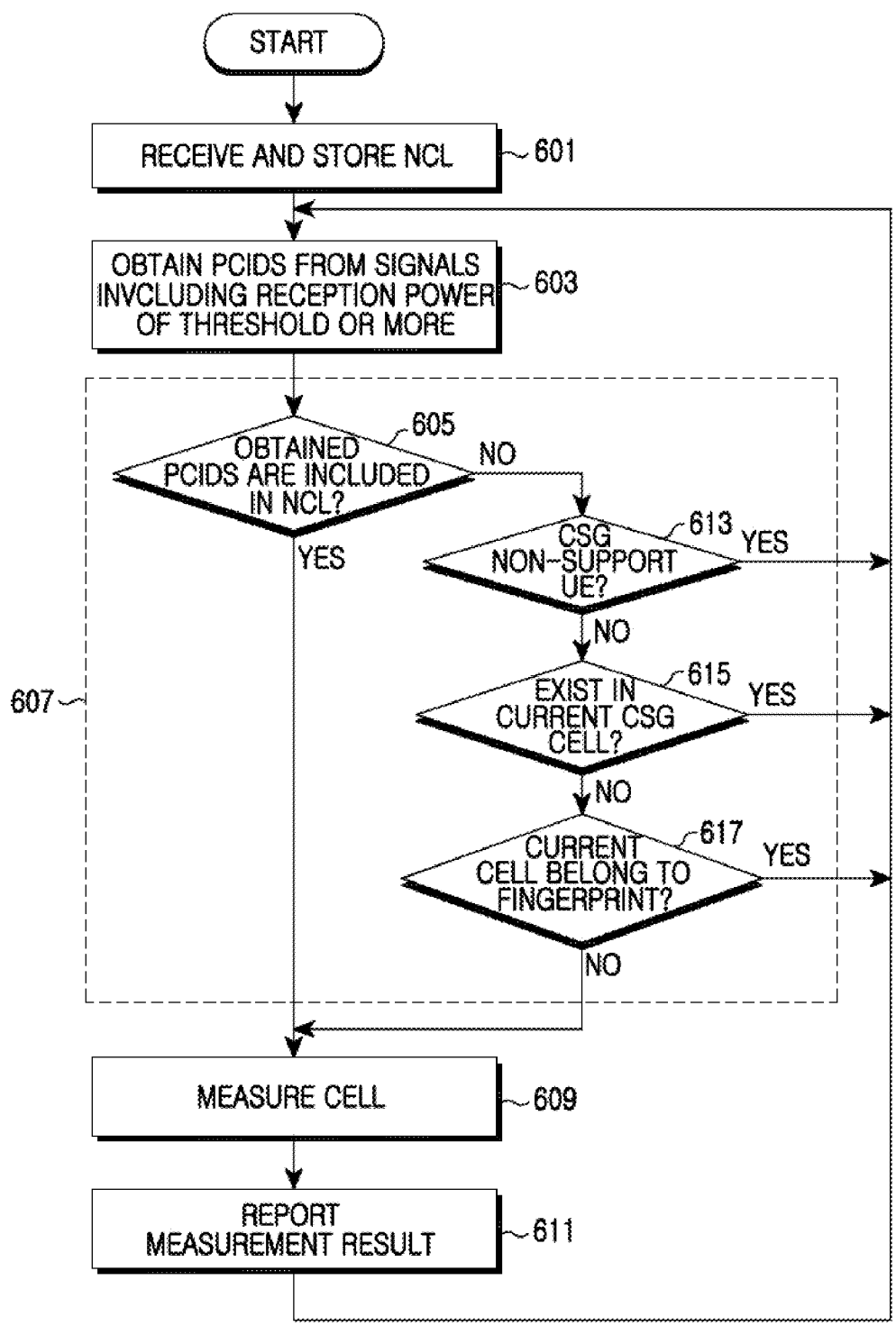
FIG. 6 is a flowchart identifying, at a UE in an active state, a base station in a wireless communication system according to an exemplary embodiment of the present invention.

FIG. 6 is a flowchart identifying, at a UE in an active state, a base station in a wireless communication system according to an exemplary embodiment of the present invention.

Referring to FIG. 6, in step 601, the UE in the active state receives an NCL from a serving macro base station or a serving femto base station, and stores the NCL. When the serving base station is a macro base station, the received NCL includes information of neighbor macro base stations. When the serving base station is a femto base station, the received NCL may include information of a macro base station to which the femto base station belongs, or include information of a macro base station including the CSG of the UE and information of femto base stations which belong to the CSG.

In step 603, the UE obtains PCIDs of relevant base stations from signals including reception power of at least a predefined threshold. In step 605, the UE determines whether the obtained PCIDs of the respective base stations are included in the stored NCL. When the NCL of the femto base station includes information of a macro base station, the UE may identify whether the relevant base station is a macro base station or a femto base station through step 605. When the NCL of the femto base station includes information of the macro base station and information of a femto base station which belongs to the CSG, the UE may determine whether the relevant base station is an accessible base station through step 605.

When the obtained PCID is included in the stored NCL, the UE performs step 609. When the obtained PCID is not included in the stored NCL, the UE performs step 613. Assuming that the NCL of the femto base station includes information of a macro base station with reference to FIG. 3, in the cases of (c) and (d), the obtained PCID exists in the NCL. In the cases of (a), (b), (e), (f) and (g), the obtained PCID does not exist in the NCL. On the other hand, assuming that the NCL of the femto base station includes information of the macro base station and information of femto base stations which belong to the CSG, in the cases of (c), (d) and (e), the obtained PCID exists in the NCL. In the cases of (a), (b), (f) and (g), the obtained PCID does not exist in the NCL.

In step 613, the UE determines whether the UE is a CSG non-support UE. Here, the CSG non-support UE denotes the UE not including a CSG cell which receives a service. When the UE is a CSG non-support UE, the UE returns to step 603 and performs subsequent steps.

On the other hand, when the UE is not a CSG non-support UE, the UE determines whether a serving base station which currently provides a service is a femto base station which belongs to the CSG of the UE or a macro base station in step 615. Accordingly, whether the serving base station is the femto base station which belongs to the CSG may be recognized by comparing system information of the serving base station with a white list stored by the UE.

When the serving base station of the UE is the femto base station which belongs to the CSG, the UE returns to step 603 and performs the subsequent steps. For example, referring to FIG. 3, when a base station F3 of a received signal is not included in the NCL of a serving base station F1, and the serving base station F1 is a femto base station which belongs to the CSG as in the case of (f), the UE determines that the UE cannot access the base station F3. Here, assuming that the NCL of the femto base station includes information of macro base stations, in the case of (e) of FIG. 3, the UE cannot directly access the base station F2 due to steps 605 and 615, but returns to step 603 to access the base station M1 or M2 and then access the base station F2.

On the other hand, when the serving base station of the UE is a macro base station, the UE determines whether the serving base station is a base station which belongs to a fingerprint stored in the UE in step 617. For example, referring to FIG. 3, when the UE receives a service from a macro base station, and a received signal of the base station is not included in the NCL as in the cases of (a), (b) and (g), the UE determines whether the macro base station is a macro base station including the CSG of the UE. Here, when the UE does not support a fingerprint, the UE does not perform step 617 but may proceed from step 615 to step 609.

When the serving macro base station does not belong to a fingerprint, the UE returns to step 603 and performs the subsequent steps. For example, referring to FIG. 3, when UE using the macro base station M3 as a serving base station moves in the case of (g) and receives a signal of the femto base station F4, since the femto base station F4 is not included in the NCL of the macro base station M3 and the macro base station M3 is not included in a fingerprint, the UE determines that the UE cannot access the femto base station F4.

On the other hand, when the serving macro base station belongs to the fingerprint, the UE performs step 609. For example, referring to FIG. 3, when the UE using the macro base station M1 as a serving base station moves in the case of (a) or (b) and receives a signal of the femto base station F1 or F3, since the femto base station F1 or F3 is not included in the NCL of the macro base station M1, and the macro base station M1 is included in the fingerprint, the UE performs step 609 in order to determine whether the femto base station F1 or F3 is an accessible femto base station.

In step 609, the UE receives system information of a relevant base station and performs signal measurement for a handover. Here, when the relevant base station is a femto base station, the UE may perform signal measurement on accessible femto base stations which belong to the CSG, i.e., femto base stations included in the white list, or may perform signal measurement on femto base stations which belong to all CSGs depending on a request of a system.

In step 611, the UE reports the signal measurement result to the serving base station, and returns to step 603. Although not illustrated, when it is determined that the relevant base station is an inaccessible femto base station through the received system information, the UE does not perform step 611 of reporting the signal measurement result to the serving base station, but returns to step 603.

Figure 7:
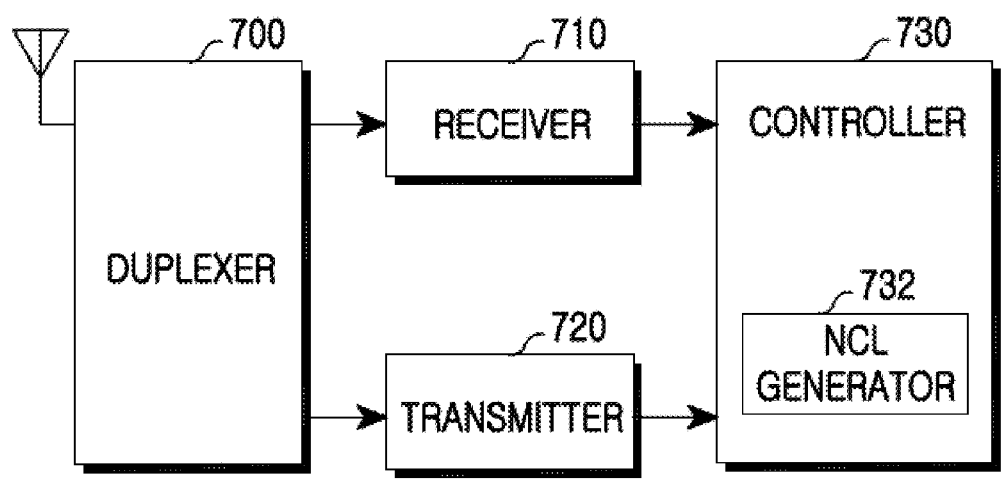
FIG. 7 is a block diagram illustrating a femto base station in a wireless communication system according to an exemplary embodiment of the present invention.

FIG. 7 is a block diagram illustrating a femto base station in a wireless communication system according to an exemplary embodiment of the present invention.

Referring to FIG. 7, the femto base station includes a duplexer 700, a receiver 710, a transmitter 720 and a controller 730. The controller 730 includes an NCL generator 732.

The duplexer 700 transmits a transmission signal provided from the transmitter 720 via an antenna, and provides a reception signal from the antenna to the receiver 710 according to a duplexing scheme.

The receiver 710 converts a reception signal provided from the duplexer 700 to a baseband signal and provides the baseband signal to the controller 730. For example, when the wireless communication system uses an OFDM scheme, the receiver 710 includes an RF processor, an ADC, an OFDM demodulator and a decoder. The RF processor converts an RF signal provided from the duplexer 700 to a baseband analog signal. The ADC converts the analog signal provided from the RF processor to digital sample data. The OFDM demodulator converts sample data in the time domain provided from the ADC to data in the frequency domain by performing FFT. The decoder demodulates and decodes a signal provided from the OFDM demodulator according to an MCS level.

The controller 730 controls an overall operation of the femto base station. More particularly, the controller includes the NCL generator 732 and controls and processes a function for generating an NCL and transmitting the NCL to a UE. The NCL generator 732 may generate an NCL including information of macro base stations to which the femto base station itself belongs. The NCL generator 732 may also generate an NCL including information of a macro base station including a CSG cell of the femto base station itself and information of different femto base stations which belong to the CSG. For example, referring to FIG. 3, the femto base station F1 may generate an NCL including information of the macro base station M1 to which the femto base station F1 itself belongs. The femto base station F1 may also generate an NCL including information of the femto base station F2 which belongs to the same CSG and information of the macro base stations M1 and M2 including the CSG. The NCL includes PCIDs of respective base stations included in the white list.

The transmitter 720 converts a transmission signal to an RF signal and provides the RF signal to the duplexer 700 under control of the controller 730. For example, when the wireless communication system uses an OFDM scheme, the transmitter 720 includes an encoder, an OFDM modulator, a Digital/Analog Converter (DAC) and an RF processor. The encoder encodes and modulates a transmission signal according to an MCS level under control of the controller 730. The OFDM modulator converts data in the frequency domain provided from the encoder to sample data (i.e., an OFDM symbol) in the time domain by performing IFFT. The DAC converts sample data provided from the OFDM modulator to an analog signal. The RF processor converts a baseband analog signal provided from the DAC to an RF signal.

Figure 8:
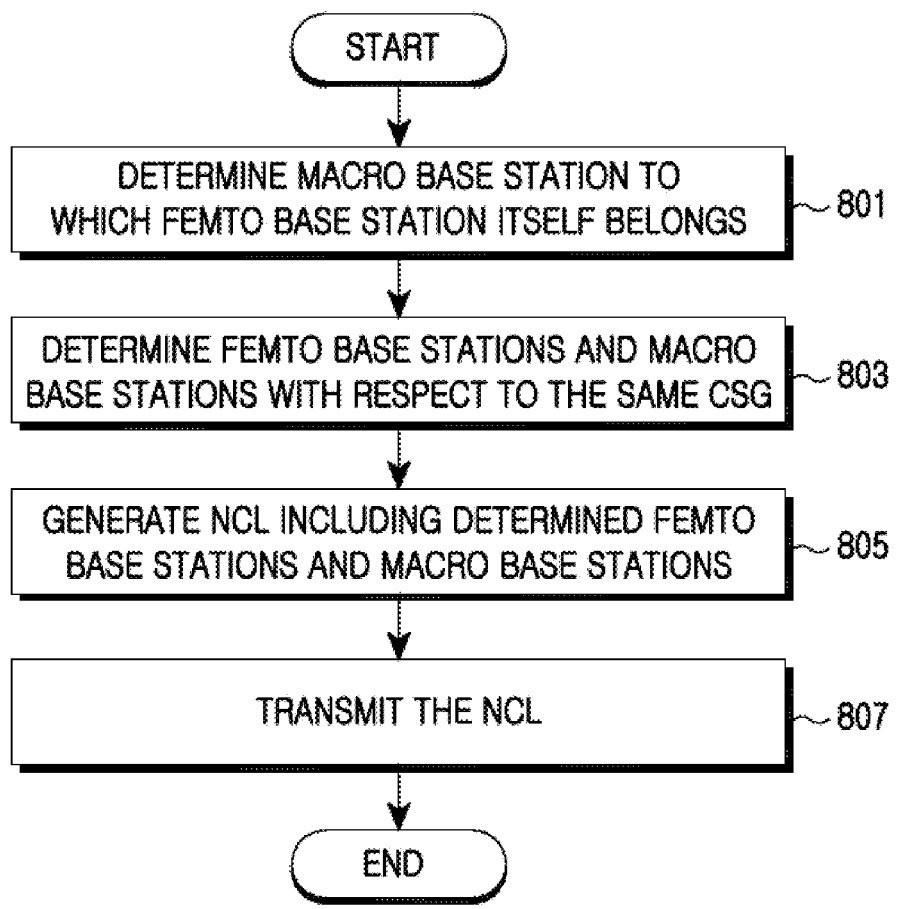
FIG. 8 is a flowchart illustrating a procedure for generating and broadcasting a Neighbor Cell List (NCL) at a femto base station of a wireless communication system according to an exemplary embodiment of the present invention.

FIG. 8 is a flowchart illustrating a procedure for generating and broadcasting an NCL at a femto base station of a wireless communication system according to an exemplary embodiment of the present invention.

Referring to FIG. 8, in step 801, the femto base station determines a macro base station to which the femto base station itself belongs. In step 803, the femto base station determines different femto base stations belonging to a CSG to which the femto base station itself belongs and macro base stations including the CSG.

In step 805, the femto base station generates an NCL including information of the determined macro base stations and femto base stations, and in step 807, the femto base station transmits the generated NCL to a UE. The NCL includes PCIDs of respective base stations as information of the determined macro base stations and femto base stations.

The femto base station then ends the operation.

In FIG. 8, though the femto base station generates the NCL including both information of the femto base stations which belong to the CSG and information of the macro base stations including the CSG, the femto base station may generate an NCL including information of macro base stations to which the femto base station itself belongs.

According to exemplary embodiments of the present invention, a UE may identify a base station in a physical layer without modification of a standard. Thus, a processing time and a resource may be saved by identifying a macro base station and a femto base station and identifying a femto base station accessible by the UE itself using an NCL and PCIDs of respective base stations.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for identifying, at a User Equipment (UE), a base station in a wireless communication system, the method comprising:
   storing a Neighbor Cell List (NCL) received from a serving base station;
   obtaining a Physical Cell IDentifier (PCID) from a signal received from a neighbor base station; and
   identifying whether the neighbor base station is at least one of a macro base station and a femto base station by determining whether the obtained PCID exists in the stored NCL,
   wherein if the serving base station is a macro base station, the NCL comprises information of a neighbor macro base station, and if the serving base station is a femto base station, the NCL comprises information of a macro base station with which the femto base station is associated.

2. The method of claim 1, wherein the identifying of whether the neighbor base station is the at least one of the macro base station and the femto base station comprises:
   if the obtained PCID exists in the stored NCL, identifying the neighbor base station as a macro base station; and
   if the obtained PCID does not exist in the stored NCL, identifying the neighbor base station as a femto base station.

3. The method of claim 2, further comprising:
   when identifying the neighbor base station as the femto base station, determining whether the serving base station is at least one of a macro base station and a femto base station; and
   if the serving base station is the femto base station, identifying the neighbor base station as an inaccessible base station.

4. The method of claim 3, further comprising:
   if the serving base station is the macro base station, determining whether the serving base station comprises a femto base station accessible by the UE;
   if the serving base station does not comprise the femto base station accessible by the UE, identifying the neighbor base station as an inaccessible femto base station; and
   if the serving base station comprises the femto base station accessible by the UE, determining whether the neighbor base station is an accessible base station by receiving system information of the neighbor base station.

5. The method of claim 1, wherein if the serving base station is a femto base station, the NCL further comprises information of different neighbor femto base stations included in a Closed Subscriber Group (CSG) of the femto base station.

6. The method of claim 5, wherein the identifying of whether the neighbor base station is the at least one of the macro base station and the femto base station comprises:
if the obtained PCID exists in the stored NCL, identifying the neighbor base station as an accessible base station, and if the obtained PCID does not exist in the stored NCL, determining whether the serving base station is at least one of a macro base station and a femto base station.

7. The method of claim 6, further comprising:
if the serving base station is the macro base station, determining whether the serving base station comprises a femto base station accessible by the UE;
if the serving base station does not comprise the femto base station accessible by the UE, identifying the neighbor base station as an inaccessible femto base station; and
if the serving base station comprises the femto base station accessible by the UE, determining whether a relevant base station is an accessible base station by receiving system information of the neighbor base station.

8. The method of claim 6, further comprising, if the serving base station is the femto base station, identifying the neighbor base station as an inaccessible base station.

9. A method for generating a Neighbor Cell List (NCL) of a femto base station in a wireless communication system, the method comprising generating, by a controller, a Neighbor Cell List (NCL) comprising Physical Cell IDentifiers (PCIDs) of macro base stations with which the femto base station itself is associated, and PCIDs of different neighbor femto base stations which are associated with a Closed Subscriber Group (CSG) of the femto base station itself.

10. An apparatus of a User Equipment (UE) for identifying a base station in a wireless communication system, the apparatus comprising:
a storage unit for storing a Neighbor Cell List (NCL) received from a serving base station;
a receiver for receiving signals from the serving base station and a neighbor base station; and
a controller for obtaining a Physical Cell IDentifier (PCID) from a signal received from the neighbor base station, and for identifying whether the neighbor base station is at least one of a macro base station and a femto base station by determining whether the obtained PCID exists in the stored NCL,
wherein if the serving base station is a macro base station, the NCL comprises information of a neighbor macro base station, and if the serving base station is a femto base station, the NCL comprises information of a macro base station with which the femto base station is associated.

11. The apparatus of claim 10, wherein if the obtained PCID exists in the stored NCL, the controller identifies the neighbor base station as a macro base station, and if the obtained PCID does not exist in the stored NCL, the controller identifies the neighbor base station as a femto base station.

12. The apparatus of claim 11, wherein when identifying the neighbor base station as the femto base station, the controller determines whether the serving base station is at least one of a macro base station and a femto base station, and if the serving base station is the femto base station, the controller identifies the neighbor base station as an inaccessible base station.

13. The apparatus of claim 12, wherein if the serving base station is the macro base station, the controller determines whether the serving base station comprises a femto base station accessible by the UE, if the serving base station does not comprise the femto base station accessible by the UE, the controller identifies the neighbor base station as an inaccessible femto base station, and if the serving base station comprises the femto base station accessible by the UE, the controller determines whether a relevant base station is an accessible base station by receiving system information of the neighbor base station.

14. The apparatus of claim 10, wherein if the serving base station is a femto base station, the NCL further comprises information of different neighbor base stations included in a Closed Subscriber Group (CSG) of the femto base station.

15. The apparatus of claim 14, wherein if the obtained PCID exists in the stored NCL, the controller identifies the neighbor base station as an accessible base station, and if the obtained PCID does not exist in the stored NCL, the controller determines whether the serving base station is at least one of a macro base station and a femto base station.

16. The apparatus of claim 15, wherein if the serving base station is the macro base station, the controller determines whether the serving base station comprises a femto base station accessible by the UE, if the serving base station does not comprise the femto base station accessible by the UE, the controller identifies the neighbor base station as an inaccessible femto base station, and if the serving base station comprises the femto base station accessible by the UE, the controller determines whether the neighbor base station is an accessible base station by receiving system information of the neighbor base station.

17. The apparatus of claim 15, wherein if the serving base station is the femto base station, the controller identifies the neighbor base station as an inaccessible base station.

18. An apparatus for generating a Neighbor Cell List (NCL) of a femto base station in a wireless communication system, the apparatus comprising a controller for generating a Neighbor Cell List (NCL) comprising Physical Cell IDentifiers (PCIDs) of macro base stations with which the femto base station itself is associated, and PCIDs of different neighbor femto base stations which are associated with a Closed Subscriber Group (CSG) of the femto base station itself.

* * * * *